United States Patent [19]

Miller

[11] 4,296,484

[45] Oct. 20, 1981

[54] DATA DISPLAY SYSTEM

[75] Inventor: Terry A. Miller, Bartlesville, Okla.

[73] Assignee: Phillips Petroleum Company, Bartlesville, Okla.

[21] Appl. No.: 955,842

[22] Filed: Oct. 30, 1978

[51] Int. Cl.³ .......................... G01V 1/22; G01V 1/34
[52] U.S. Cl. ....................................... 367/71; 367/77; 367/79; 346/33 C; 346/110 R
[58] Field of Search ......................... 367/69, 71, 77, 79; 346/33 C, 107 SC, 110 R; 315/367, 392, 394; 340/724, 731, 722, 741

[56] References Cited

U.S. PATENT DOCUMENTS

| | | | |
|---|---|---|---|
| 2,950,459 | 8/1960 | Loper et al. | 367/71 |
| 2,997,690 | 8/1961 | Evans | 367/71 |
| 3,588,911 | 6/1971 | Luke et al. | 367/71 |
| 3,742,289 | 6/1973 | Koeijmans | 367/71 |
| 3,763,472 | 10/1973 | Sharp . | |
| 3,922,643 | 11/1975 | Poole . | |
| 3,931,480 | 1/1976 | Poole | 179/84 VF |
| 3,936,611 | 2/1976 | Poole | 179/15.55 T |
| 3,942,163 | 3/1976 | Goyal | 340/173 R |
| 4,042,906 | 8/1977 | Ezell | 367/79 |
| 4,070,710 | 1/1978 | Sukonick et al. | 340/724 |
| 4,072,923 | 2/1978 | Siems et al. | 367/78 |
| 4,153,896 | 5/1979 | White | 340/731 |

OTHER PUBLICATIONS

"The CCD's Future Takes on a Bright Hue", *Electronics*, Armstrong, vol. 50, No. 23, p. 6566, Nov. 1977.
"Tough Mathematical Tasks are Child's Play for Number Cruncher", *Electronics*, vol. 50, No. 4, p. 102-107, Feb. 1977.

*Primary Examiner*—Howard A. Birmiel

[57] ABSTRACT

A display system is provided in which the data from a plurality of data channels is displayed on a cathode ray tube (CRT) display device. Automatic gain control is utilized to ensure that essentially the entire screen of the CRT display device is filled even if the number of data channels available to supply data to be displayed varies. Digital gain ranging circuitry is provided to ensure that the automatic gain control circuit is not overloaded by a large variation in the number of data channels available to supply data to be displayed. Circuitry is also provided to enable the highlighting of data from a particular data channel on the CRT display device to thereby provide easier viewing of the data, from that particular data channel, for an operator.

23 Claims, 13 Drawing Figures

DATA DISPLAY SYSTEM

This invention relates to method and apparatus for displaying data. In a particular aspect, this invention relates to method and apparatus for displaying data from a plurality of data channels. In another particular aspect, this invention relates to method and apparatus for using substantially the entire screen of a CRT display device to display data from a plurality of data channels where the number of data channels available to supply data to be displayed varies. In another particular aspect, this invention relates to method and apparatus for preventing the overloading of an automatic gain control circuit which is used to enable substantially the entire screen of a CRT display device to be utilized to display data for a plurality of data channels where the number of data channels available to supply data, to be displayed, varies. In another particular aspect, this invention relates to method and apparatus for highlighting data from a particular data channel on a CRT display device.

In many data acquisition systems and communication systems, data is provided from a plurality of sources to a central location for processing or use. The data is usually provided through a plurality of data channels from the plurality of data sources. An example of this would be a seismic exploration system where the data from a plurality of geophones is provided to a central location for processing by means of a plurality of data channels.

Where data is being supplied to a central location through a plurality of data channels, it is often desirable to be able to check the operability of a particular data channel or to be able to check to determine that all of the data channels are operable and are supplying data from the various sources to the central location. A CRT display device provides a convenient means by which the data which is being provided by a plurality of data channels can be displayed thus providing a visual indication of whether or not a particular data channel is operable.

When using a CRT display device, it is particularly desirable from an operator standpoint that substantially the entire screen of the CRT be utilized, for ease in visual identification of the data being displayed. If only a few data channels are supplying data to the central location then the display of data on the CRT display device can be spread out if the entire screen of the CRT display device is utilized. If a large number of data channels are provided data to the central location, then the data must be compacted to get all of the data from all of the data channels on the screen of the CRT display device. It is desirable that, no matter how many data channels are providing data to the CRT display device, the entire screen of the CRT display device be utilized to display the data. It is thus an object of this invention to provide method and apparatus for using substantially the entire screen of a CRT display device to display data for a plurality of data channels where the number of data channels available to supply data to be displayed varies.

Automatic gain control circuits can be utilized to spread out or compact a display on a CRT screen. However, if the number of data channels which must be displayed varies greatly, then the capabilities of the automatic gain control circuit may be overloaded. It is thus another object of this invention to provide method and apparatus for preventing the overloading of an automatic gain control circuit which is used to enable substantially the entire screen of a CRT display device to be utilized to display data from a plurality of data channels where the number of data channels available to supply data, to be displayed, varies.

Often, only the data being supplied by one data channel will be of interest to the operator who is viewing the screen of the CRT display device. If the data from a large number of data channels is being displayed on the screen of a CRT display device, then it may be difficult to pick out the data from the particular data channel of interest. It is thus another object of this invention to provide method and apparatus for highlighting data from a particular data channel on a CRT display device to provide a means by which an operator can easily pick out data being supplied from a particular data channel of interest.

In accordance with the present invention, method and apparatus is provided whereby the data from a plurality of data channels is provided to the Y input of a CRT display device by samples. All of the first samples of the data from the plurality of data channels are first provided to the Y input of the CRT display device. Then all of the second samples of the data from the plurality of data channels are provided to the Y input of the CRT display device. This procedure continues until all of the samples of the data from the plurality of data channels have been provided to the Y input of the CRT display device.

The data is displayed as a function of the data channel which provided the particular data sample. The display will change each time another sample of the data from the plurality of data channels is provided to the Y input of the CRT display device. This provides an indication of both the quality of the data being provided by means of the plurality of data channels and also the operability of the data channel itself.

The data channels, which are supplying data to be displayed on the CRT display device, are displayed as the X coordinant of the data display. An automatic gain control circuit is provided which ensures that, if only three data channels are available, then the three data channels will be spaced essentially equally across the screen of the CRT display device to therefore use essentially all of the screen of the CRT display device to display the data which is being supplied from the three data channels. If sixty data channels are available to supply data to be displayed, then the automatic gain control circuit assures that the data from the sixty data channels will be spaced essentially equally across the screen of the CRT display device. In this manner, no matter how many data channels are available to be displayed, essentially all of the screen of the CRT display device will be utilized for displaying the data available.

A counter is utilized to provide an indication of which data channel is supplying a particular data sample. The output of the counter will count from a count of 1 to a count representative of the total number of data channels which are available. The output of the counter is converted from digital-to-analog form by a digital-to-analog (D/A) converter. The count of the total number of data channels available is utilized, after being converted to analog form, by the automatic gain control (AGC) circuit to space the data channels across the screen of the CRT display device. However, if the number of data channels which must be displayed vary substantially, the output from the D/A converter may have a dynamic range which is too great for the AGC circuit because the output level from the D/A converter will be a function of the number of channels of data being provided to the CRT display device. A digital gain ranging circuit is provided to overcome this dynamic range problem by controlling the manner in which the channel count signal from the counter is provided to a D/A converter. If only a few channels of data are available, the channel count signal is supplied to the most significant bit inputs of the D/A converter. By using the most significant bit inputs of the D/A converter, a signal having a dynamic range compatible with the input requirements of the AGC circuit is provided.

A circuit is provided for enhancing the data from a particular data channel of interest by comparing the channel count output from the counter to a signal which is representative of the data channel which is to be enhanced. When the channel count signal equals the signal representative of the channel which is to be enhanced, the output of a comparator is provided to the Z input of the CRT data display. The Z input of the CRT data display is utilized to highlight data from a particular data channel on the CRT display device.

Other objects and advantages of the invention will be apparent from the detailed description of the invention and the appended claims as well as from the detailed description of the drawings in which:

FIG. 51 is a block diagram of the data display unit illustrated in FIG. 2a;

Figure 1:
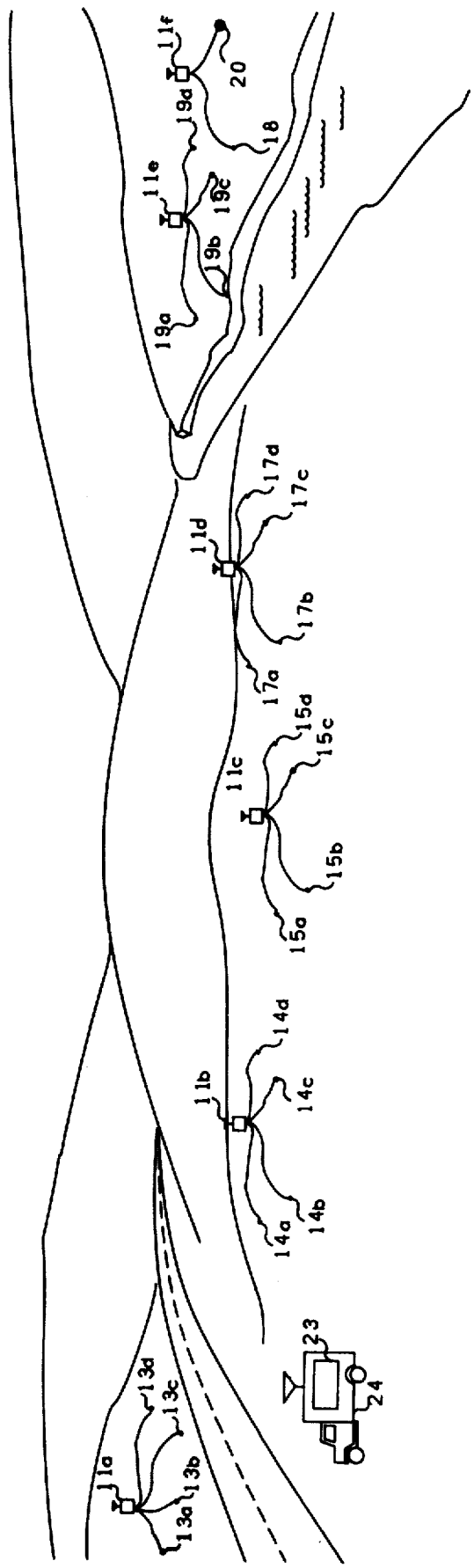
FIG. 1 is an illustration of a possible physical arrangement of the components of the seismic exploration system.
Figure 2A:
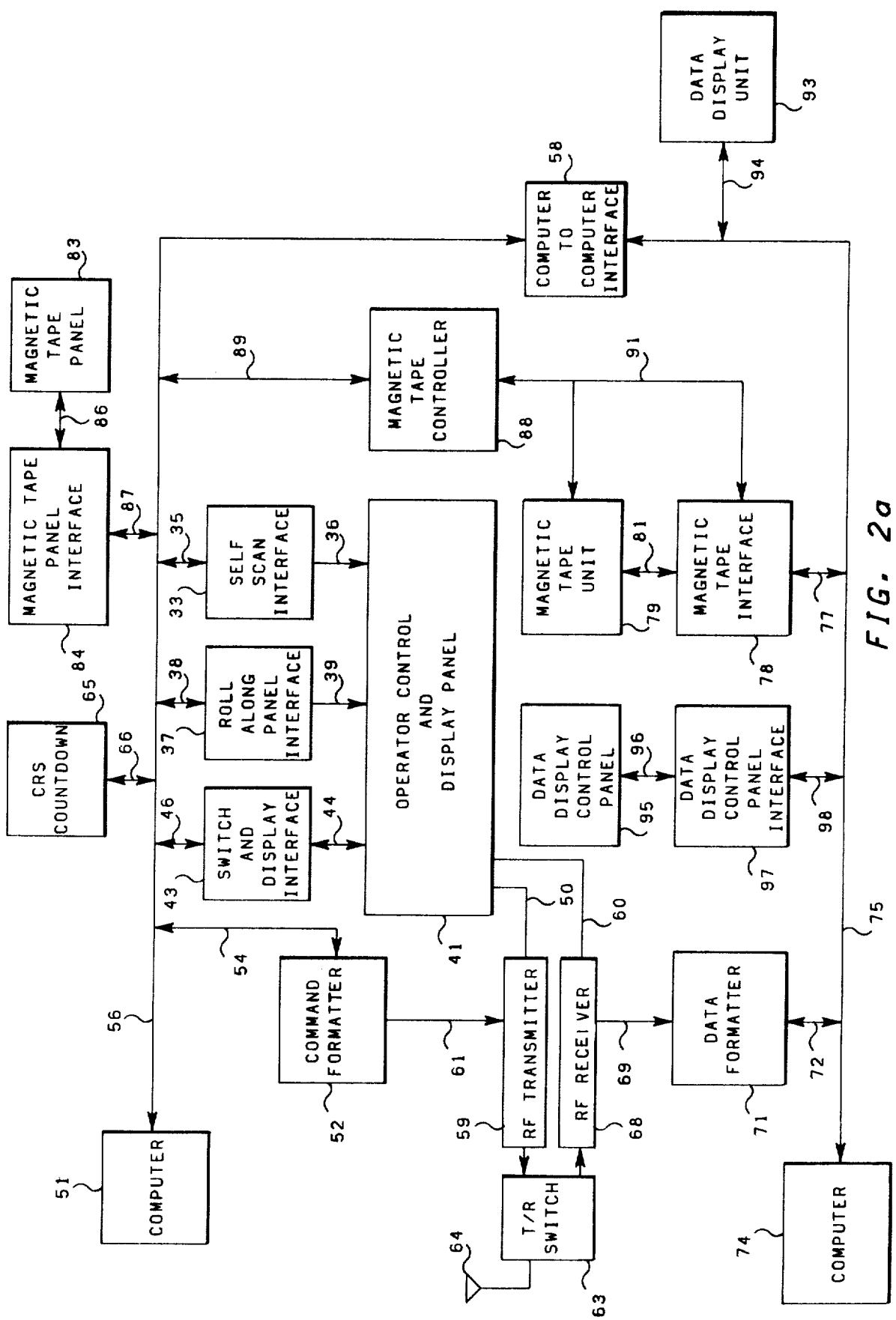
FIG. 2a is a block diagram of a central recording station.
Figure 2B:
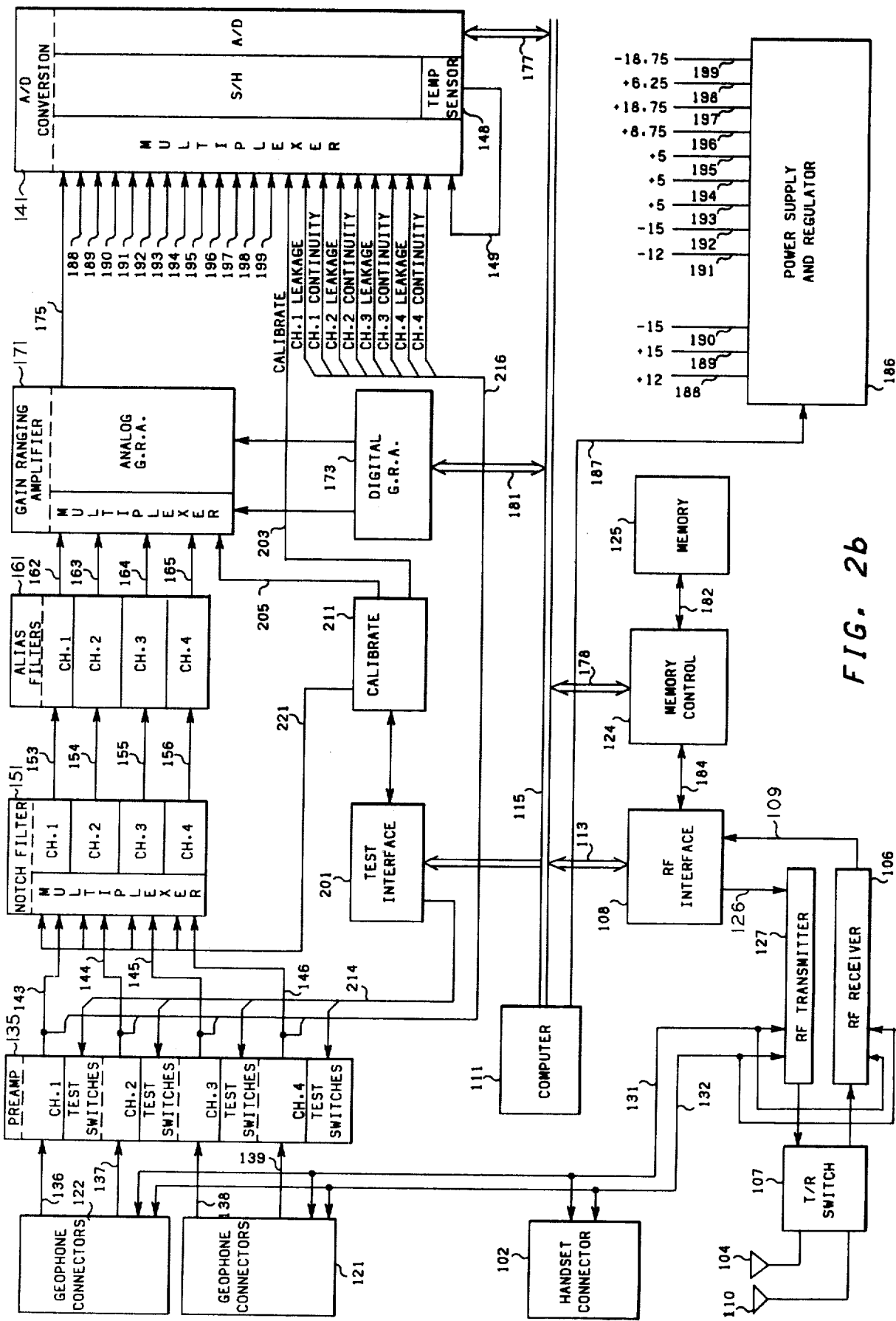
FIG. 2b is a block diagram of a remote telemetry unit.
Figure 51:
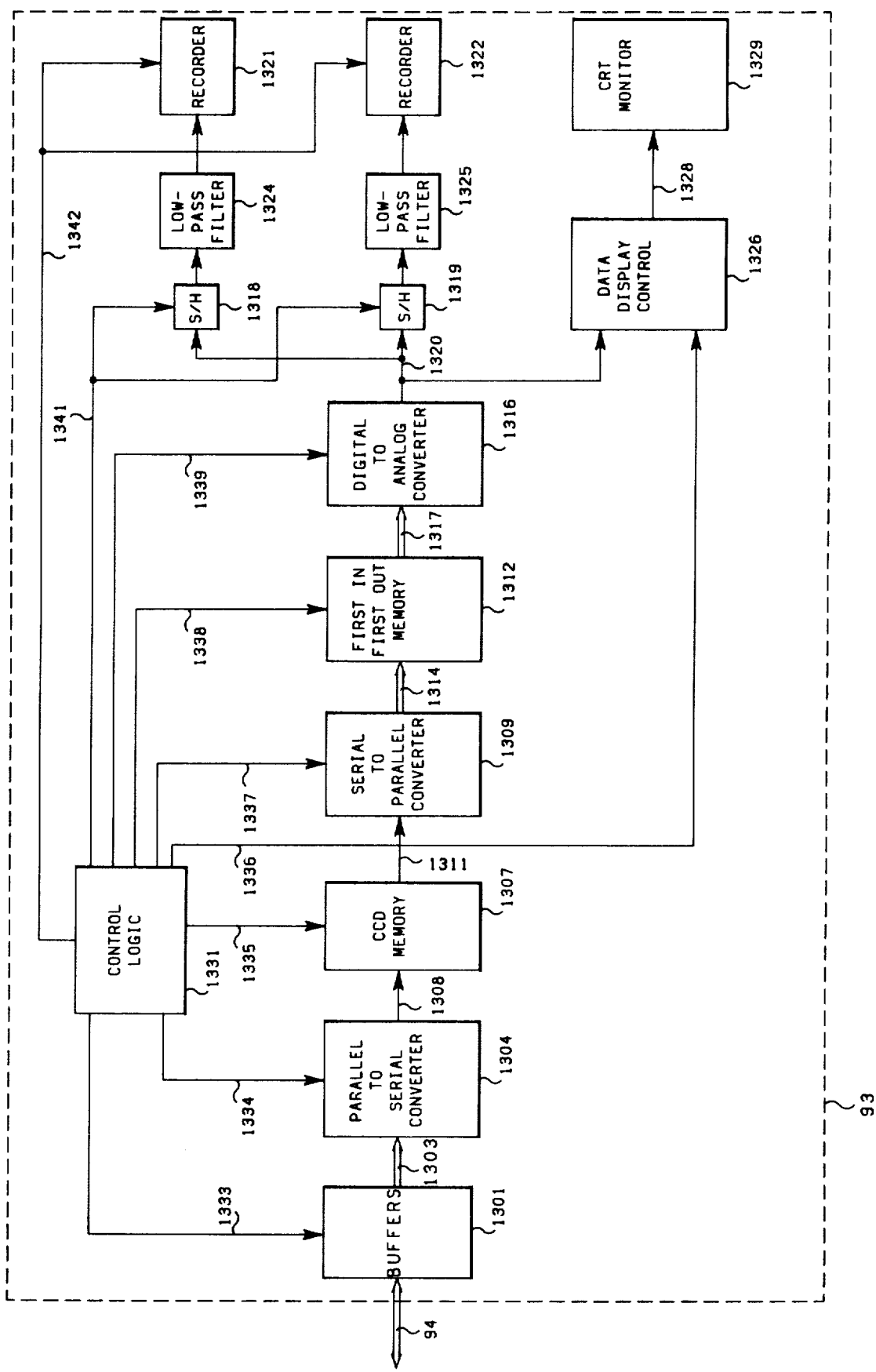
Figures 52, 53:
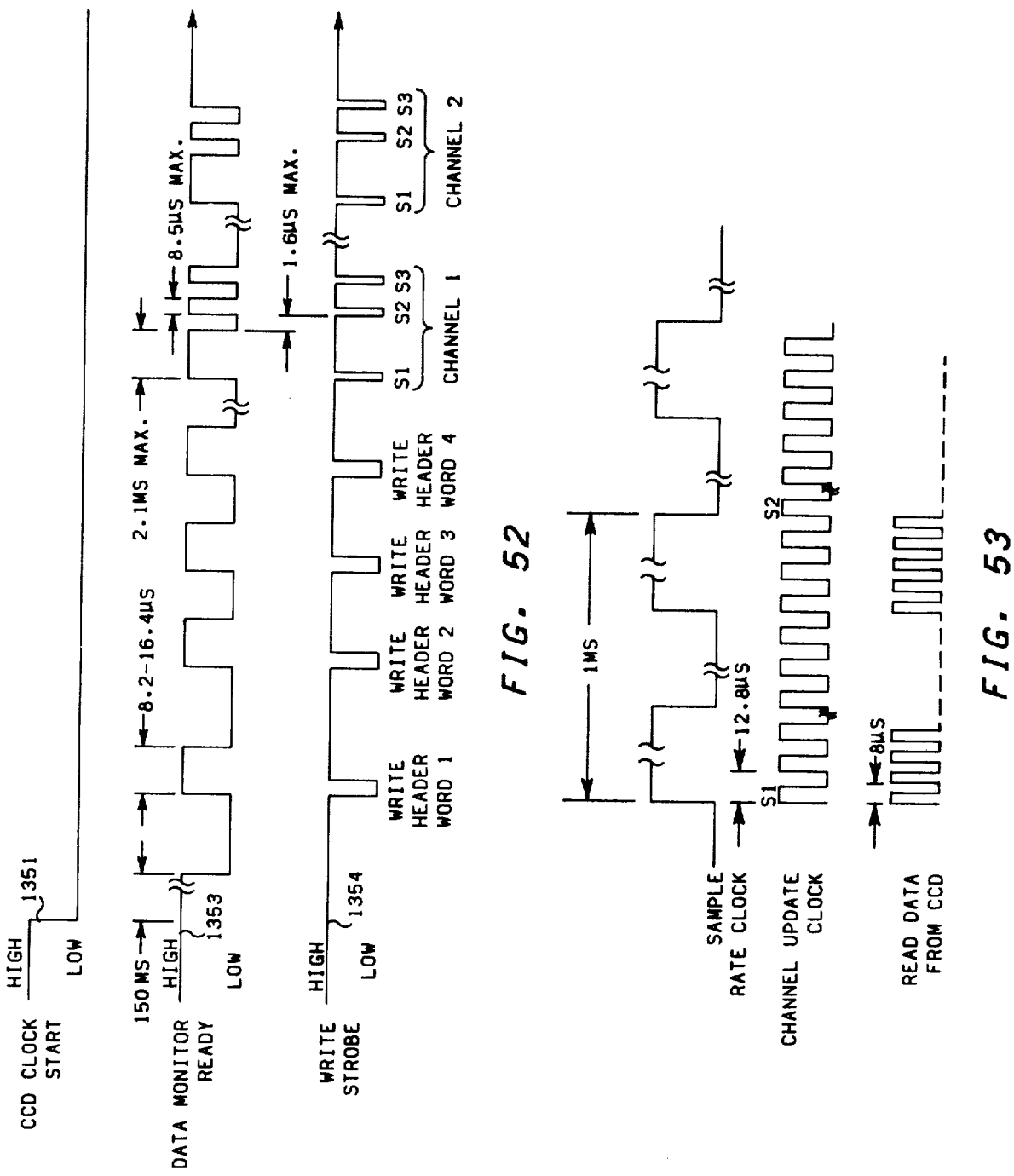
FIG. 52 is a timing diagram associated with the data display system illustrated in FIG. 51.
FIG. 53 is a timing diagram associated with the data display system illustrated in FIG. 51.
Figure 54:
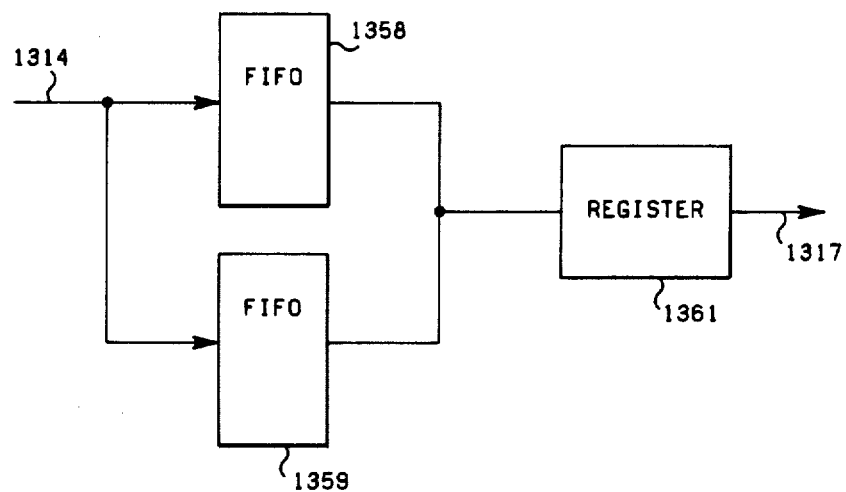
FIG. 54 is a schematic of the first-in first-out memory illustrated in FIG. 51.
Figure 55:
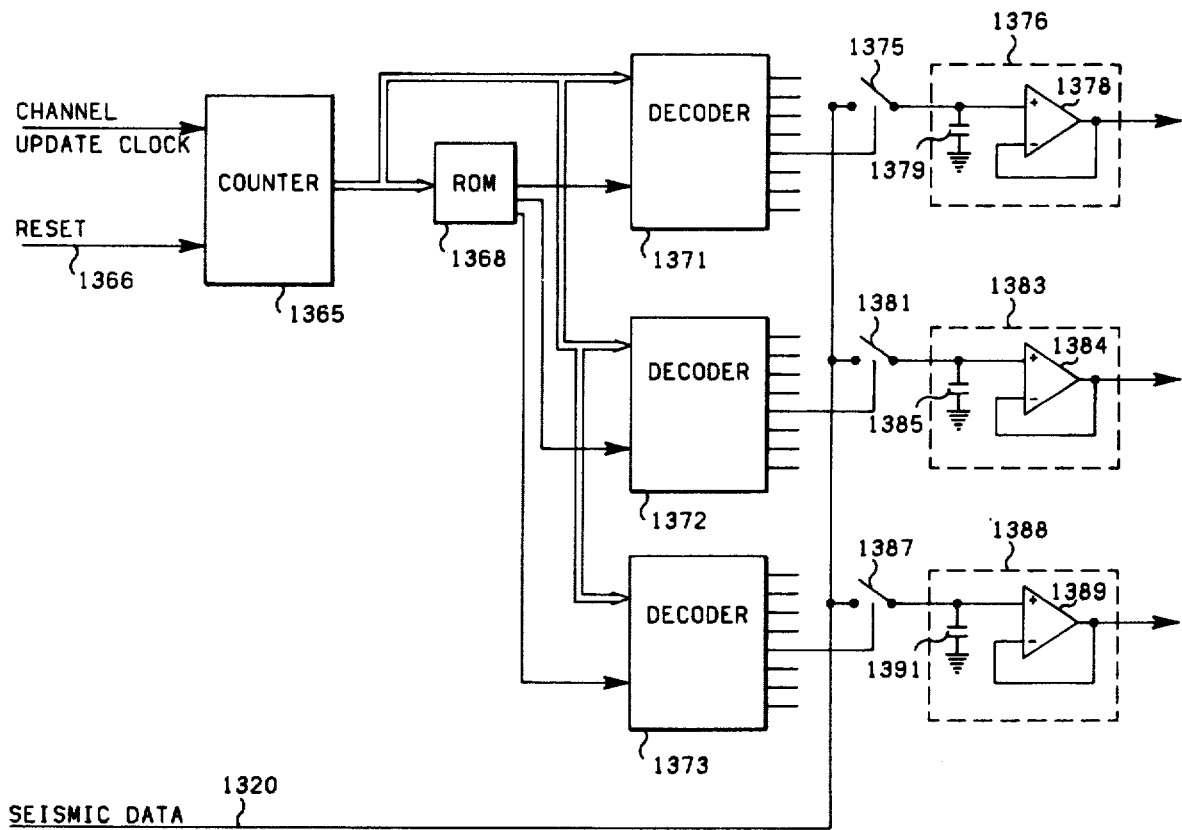
FIG. 55 is an illustration of the manner in which the sample-and-hold circuits, illustrated in FIG. 51, are addressed.
Figure 56:
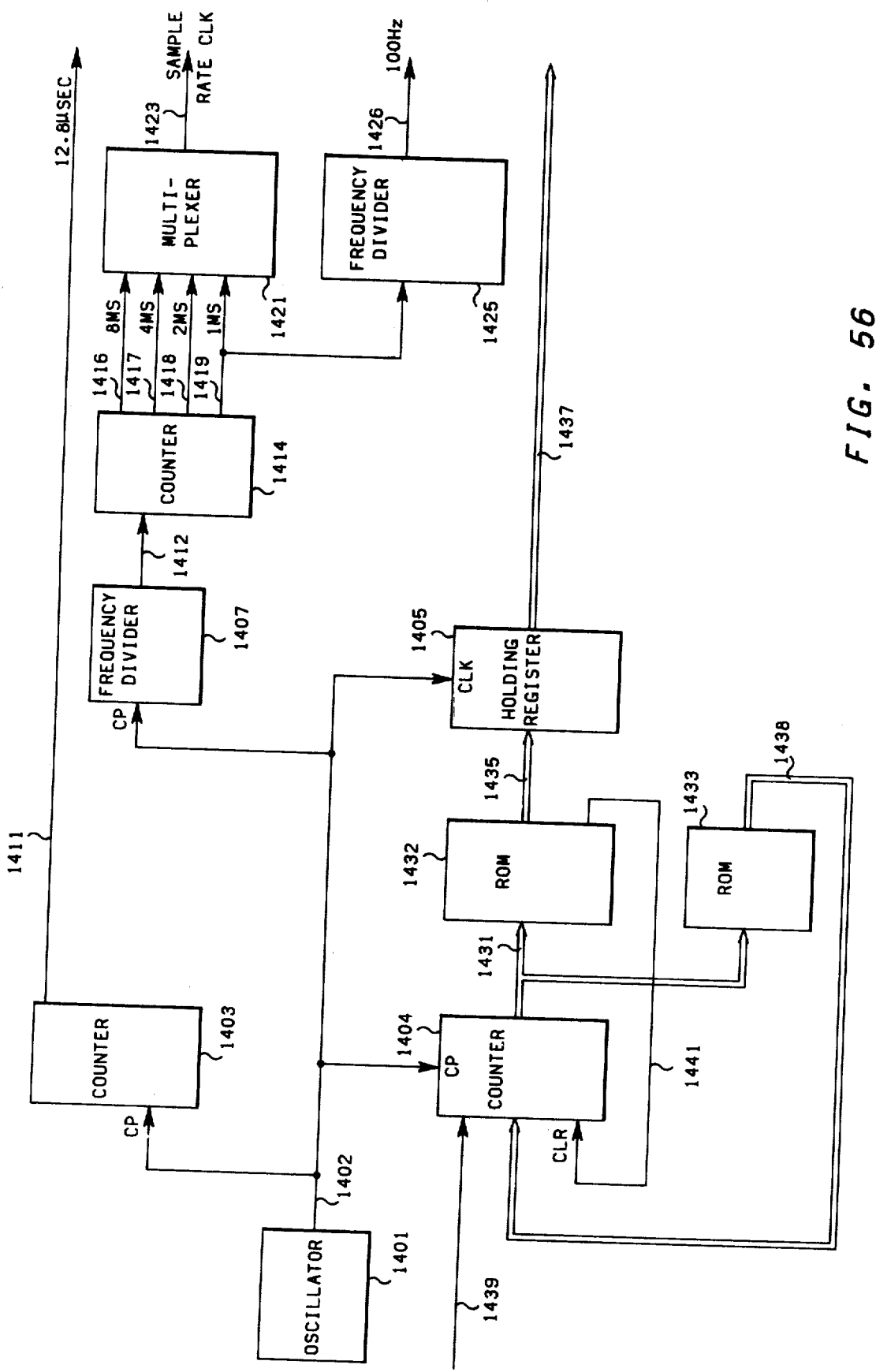
FIG. 56 is a schematic of the control logic illustrated in FIG. 51.
Figure 57:
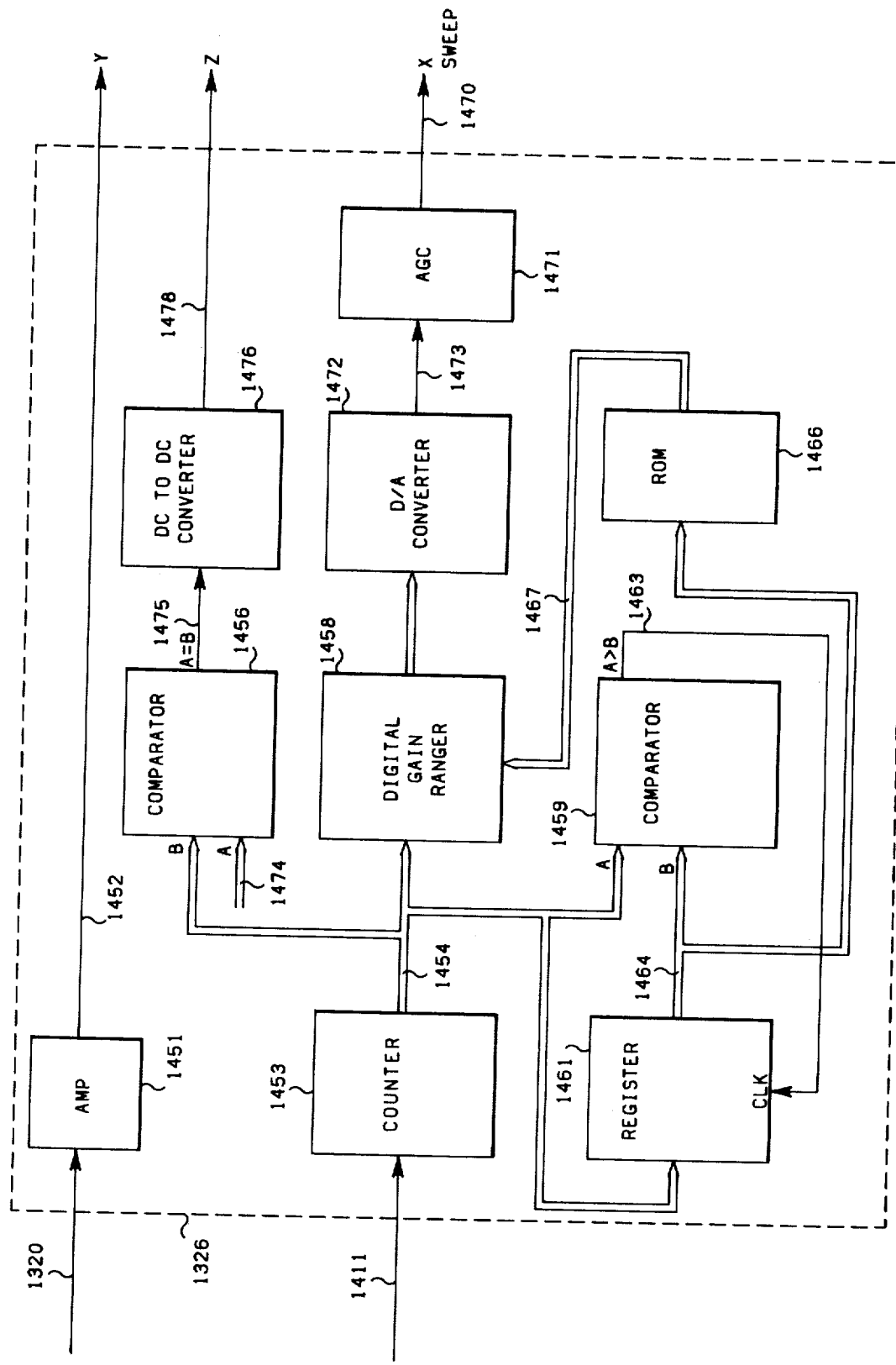
FIG. 57 is a schematic of the data display control illustrated in FIG. 51.
Figure 58:
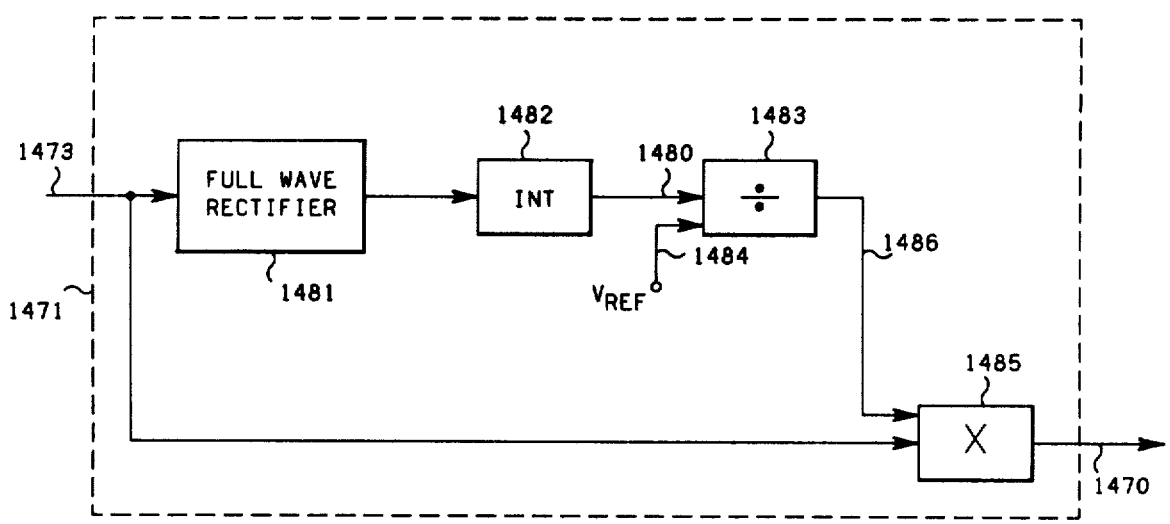
FIG. 58 is a schematic of the AGC circuit illustrated in FIG. 57.
Figure 59:
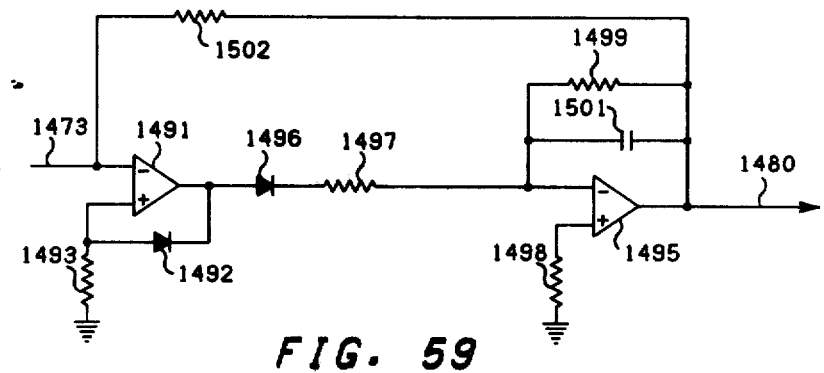
FIG. 59 is a schematic of the full wave rectifier and the integrator illustrated in FIG. 58.

FIGS. 3–50 and 60–73 of application Ser. No. 955,905, filed Oct. 30, 1978, by Robert H. Lacy, now U.S. Pat. No. 4,257,098 are hereby incorporated by reference. The brief description of FIGS. 3–50 and 60–73 in application Ser. No. 955,905, now U.S. Pat. No. 4,257,098, is also hereby incorporated by reference.

The invention is described in terms of a seismic exploration system but it is noted that the invention is not limited to a seismic exploration system but is rather applicable to any system in which it is desired to display data which is being provided from a plurality of data sources, by means of a plurality of data channels, to a central location.

In the preferred embodiment of the invention, the data to be displayed is supplied from a charge couple device (CCD) memory. However, the invention is not limited to displaying data which is supplied by CCD memory but is rather applicable to displaying data supplied from any plurality of data sources by means of a plurality of data channels.

The invention is described in terms of a specific circuit and in terms of a specific CRT display device. Different circuit components could be utilized such as equivalent components which are supplied by different manufacturers and different CRT display units could be utilized if desired.

The invention is described in terms of a display system in which the maximum display is seventy-two data channels. The invention is however applicable to display systems in which more than seventy-two data channels must be displayed.

The detailed description of the drawings and the Appendix of application Ser. No. 955,905, filed Oct. 30, 1978, by Robert H. Lacy, are hereby incorporated by reference.

I claim:

1. A method for performing a seismic geophysical survey wherein a central control means is utilized to control and acquire data from a plurality of remote geophone monitoring means, each of said remote geophone monitoring means being adapted to receive analog electrical signals from at least one geophone means, comprising the steps of:

activating at least one of said plurality of remote geophone monitoring means;

providing electrical signals, representative of seismic waves, from at least one of a plurality of geophone means to a respective one of each activated remote geophone monitoring means, said remote geophone monitoring means performing preselected data processing operations on said analog electrical signals, said preselected data processing operations comprising:

sampling said analog electrical signals; and converting the thus sampled analog electrical signals which are representative of seismic data from analog form to digital form;

transmitting said seismic data in digital form from each of the activated remote geophone monitoring means to said central control means;

displaying at least one sample of said seismic data, from each of said activated remote geophone monitoring means, on a cathode ray tube screen, in such a manner that all samples of data displayed on said cathode ray tube screen at any one time are displayed in an alternating sequence in a horizontal pattern across said cathode ray tube screen with no sample of data being displayed directly above or below another sample of data and in such a manner that each particular sample of data is displayed with respect to the data channel from which that particular sample of data was provided; and controlling the display of seismic data on said cathode ray tube screen so as to spread the display of said at least one sample of seismic data from each of said activated remote geophone monitoring means across substantially the entire screen of said cathode ray tube.

2. A method in accordance with claim wherein each of said plurality of remote geophone monitoring means is capable of supplying seismic data from a plurality of data channels to said central control means, at least one sample of data from each of said plurality of data channels being displayed on said cathode ray tube screen.

3. A method in accordance with claim 2 wherein said step of displaying at least one sample of data from each of said plurality of data channels comprises:
displaying a first sample of data from each of said plurality of data channels, on said cathode ray tube screen;
displaying a second sample of data from each of said plurality of data channels, on said cathode ray tube screen; and
continuing to display samples of data from each of said plurality of data channels sequentially, on said cathode ray tube screen, until all of the samples of data from each of said activated remote geophone monitoring means have been displayed on said cathode ray tube screen.

4. A method in accordance with claim 3 wherein said step of controlling the display of data on said cathode ray tube screen so as to spread the display of said at least one sample of data from each of said plurality of data channels across the entire screen of said cathode ray tube comprises providing a sweep voltage, for said cathode ray tube screen, which has a substantially constant voltage swing regardless of how many data channels are available to supply data to be displayed on said cathode ray tube screen.

5. A method in accordance with claim 4 wherein said step of providing a sweep voltage, for said cathode ray tube screen, having a constant voltage swing comprises:
establishing a first signal having a voltage level which is representative of the number of data channels which are available to supply data to be displayed on said cathode ray tube screen;
establishing a second signal representative of a reference voltage;
dividing said first signal by said second signal to thereby produce a third signal; and
multiplying said third signal by said first signal to produce said sweep voltage.

6. A method in accordance with claim 5 wherein said step of establishing said first signal comprises:
establishing a fourth signal which is representative of a binary representation of the total number of data channels which are available to provide data to be displayed on the said cathode ray tube screen;
providing said fourth signal to the most significant bit inputs of a digital-to-analog converter to thereby convert said fourth signal from digital form to analog form; and
providing said first signal as the output from said digital-to-analog converter.

7. A method in accordance with claim 6 additionally comprising the steps of:
establishing a fifth signal representative of the number of a particular one of said plurality of data channels, the data from which is to be highlighted on said cathode ray tube screen;
establishing a sixth signal representative of the number of a particular one of said plurality of data channels, the data from which is being currently transferred to said cathode ray tube screen;
comparing said fifth signal to said sixth signal to thereby establish a seventh signal which assumes a first logic state only when said fifth signal is equal to said sixth signal; and utilizing said seventh signal to highlight the data, from the particular data channel represented by said fifth signal, on said cathode ray tube screen.

8. A method for displaying the data from a plurality of data channels on a cathode ray tube screen comprising the steps of:
displaying at least one sample of data, from each of said plurality of data channels, on said cathode ray tube screen,
each of said plurality of remote geophone monitoring means comprising:
a plurality of means for sampling electrical signals, provided from at least one geophone means respectively;
a plurality of means for converting the sampled electrical signals into digital seismic data, each of said plurality of means for converting the sampled electrical signals into digital seismic data being associated with a respective one of said plurality of means for sampling electrical signals, each of said means for sampling electrical signals and the associated means for converting the sampled electrical signals into digital seismic data comprising a data channel; and
means for providing said digital seismic data from each of the plurality of data channels to said central control means;
said central control means comprising:
means for receiving data from said plurality of remote geophone monitoring means; and
means for displaying said data;
said means for displaying said data comprising:
a cathode ray tube screen;
means for supplying a sample of data from each of said plurality of data channels to said cathode ray tube screen to thereby display at least one sample of data from each of said plurality of data channels, on said cathode ray tube screen, in such a manner that all samples of data displayed on said cathode ray tube screen at any one time are displayed in an alternating sequence in a horizontal pattern across said cathode ray tube screen with no sample of data being displayed directly above or below another sample of data and in such a manner that each particular sample of data is displayed with respect to the data channel from which that particular sample of data was provided; and in such a manner that all samples of data displayed on said cathode ray tube screen at any one time are displayed in an alternating sequence in a horizontal pattern across said cathode ray tube screen with no sample of data being displayed directly above or below another sample of data and in such a manner that each particular sample of data is displayed with respect to the data channel from which that particular sample of data was provided; an
controlling the display of data on said cathode ray tube screen so as to spread the display of said at least one sample of data from each of said plurality of data channels across substantially the entire screen of said cathode ray tube.

9. A method in accordance with claim 8 wherein said step of displaying at least one sample of data from each of said plurality of data channels comprises:
displaying a first sample of data from each of said plurality of data channels, on said cathode ray tube screen;

displaying a second sample of data from each of said plurality of data channels, on said cathode ray tube screen; and continuing to display samples of data from each of said plurality of data channels sequentially, on said cathode ray tube screen, as a function of the data channel from which each sample of data was provided until all of the samples of data from each of said plurality of data channels have been displayed on said cathode ray tube screen.

10. A method in accordance with claim 9 wherein said step of controlling the display of data on said cathode ray tube screen so as to spread the display of said at least one sample of data from each of said plurality of data channels across substantially the entire screen of said cathode ray tube comprises providing a sweep voltage, for said cathode ray tube screen, which has a substantially constant voltage swing regardless of how many data channels are available to supply data to be displayed on said cathode ray tube screen.

11. A method in accordance with claim 10 wherein said step of providing a sweep voltage, for said cathode ray tube screen, having a constant voltage swing comprises:

establishing a first signal having a voltage level which is representative of the number of data channels which are available to supply data to be displayed on said cathode ray tube screen;

establishing a second signal representative of a reference voltage;

dividing said first signal by said second signal to thereby produce a third signal; and multiplying said third signal by said first signal to produce said sweep voltage.

12. A method in accordance with claim 11 wherein said step of establishing said first signal comprises:

establishing a fourth signal which is representative of a binary representation of the total number of data channels which are available to provide data to be displayed on the said cathode ray tube screen;

providing said fourth signal to the most significant bit inputs of a digital-to-analog converter to thereby convert said fourth signal from digital form to analog form; and providing said first signal as the output from said digital-to-analog converter.

13. A method in accordance with claim 12 additionally comprising the steps of:

establishing a fifth signal representative of the number of a particular one of said plurality of data channels, the data from which is to be highlighted on said cathode ray tube screen;

establishing a sixth signal representative of the number of particular one of said plurality of data channels, the data from which is being currently transferred to said cathode ray tube screen;

comparing said fifth signal to said sixth signal to thereby establish a seventh signal which assumes a first logic state only when said fifth signal is equal to said sixth signal; and utilizing said seventh signal to highlight the data, from the particular data channel represented by said fifth signal, on said cathode ray tube screen.

14. A seismic system for geophysical exploration comprising:

a plurality of remote geophone monitoring means, each of said remote geophone monitoring means being adapted to receive electrical signals from at least one geophone means; and a central control means for generating electrical signals for initiating the operation of said plurality of remote geophone monitoring means;

means for controlling the display of data on said cathode ray tube screen so as to spread the display of said at least one sample of data from each of said plurality of data channels across substantially the entire screen of said cathode ray tube.

15. Apparatus in accordance with claim 14 wherein said means for controlling the display of data on said cathode ray tube screen so as to substantially spread the display of said at least one sample of data from each of said plurality of data channels across the entire screen of said cathode ray tube comprises means for providing a sweep voltage, for said cathode ray tube screen, which has a substantially constant voltage swing regardless of how many data channels are available to supply data to be displayed on said cathode ray tube screen.

16. Apparatus in accordance with claim 15 wherein said means for providing a sweep voltage, for said cathode ray tube screen, having a constant voltage swing comprises:

means for establishing a first signal having a voltage level which is representative of the number of data channels which are available to supply data to be displayed on said cathode ray tube screen;

means for establishing a second signal representative of a reference voltage;

dividing means;

means for supplying said first signal and said second signal to said dividing means to therein divide said first signal by said second signal to thereby produce a third signal;

multiplying means;

means for supplying said first signal and said third signal to said multiplying means to therein multiply said third signal by said first signal to produce said sweep voltage.

17. Apparatus in accordance with claim 16 wherein said means for establishing said first signal comprises:

means for establishing a fourth signal which is representative of a binary representation of the total number of data channels which are available to provide data to be displayed on said cathode ray tube screen;

a digital-to-analog converter means having a plurality of inputs and at least one output;

means for providing said fourth signal to the most significant bit inputs of said digital-to-analog converter means to therein convert said fourth signal from digital form to analog form, said first signal being provided as the output from said digital-to-analog converter means.

18. Apparatus in accordance with claim 17 additionally comprising:

means for establishing a fifth signal representative of the number of a particualr one of said plurality of data channels, the data from which is to be highlighted on said cathode ray tube screen;

means for establishing a sixth signal representative of the number of a particular one of said plurality of data channels, the data from which is being currently transferred to said cathode ray tube screen;

means for comparing said fifth signal and said sixth signal and for establishing a seventh signal which assumes a first logic state only when said fifth signal is equal to said sixth signal; and means for supplying said seventh signal to said cathode ray tube screen to thereby highlight the data, from the particular data channel represented by said fifth signal, when said seventh signal is in said first logic state.

19. Apparatus comprising:

a cathode ray tube screen;

means for supplying a sample of data from each of a plurality of data channels to said cathode ray tube screen to thereby display at least one sample of data from each of said plurality of data channels, on said cathode ray tube screen, in such a manner that all samples of data displayed on said cathode ray tube screen at any one time are displayed in an alternating sequence in a horizontal pattern across said cathode ray tube screen with no sample of data being displayed directly above or below another sample of data and in such a manner that each particular sample of data is displayed with respect to the data channel from which that particular sample of data was provided; and means for controlling the display of data on said cathode ray tube screen so as to spread the display of said at least one sample of data from each of said plurality of data channels across substantially the entire screen of said cathode ray tube.

20. Apparatus in accordance with claim 19 wherein said means for controlling the display of data on said cathode ray tube screen so as to substantially spread the display of said at least one sample of data from each of said plurality of data channels across the entire screen of said cathode ray tube comprises means for providing a sweep voltage, for said cathode ray tube which has a substantially constant voltage swing regardless of how many data channels are available to supply data to be displayed on said cathode ray tube screen.

21. Apparatus in accordance with claim 20 wherein said means for providing a sweep voltage, for said cathode ray tube screen, having a constant voltage swing comprises:

means for establishing a first signal having a voltage level which is representative of the number of data channels which are available to supply data to be displayed on said cathode ray tube screen;

means for establishing a second signal representative of a reference voltage;

dividng means;

means for supplying said first signal and said second signal to said dividing means to therein divide said first signal by said second signal to thereby produce a third signal;

multiplying means;

means for supplying said first signal and said third signal to said multiplying means to therein multiply said third signal by said first signal to produce said sweep voltage.

22. Apparatus in accordance with claim 21 wherein said means for establishing said first signal comprises:

means for establishing a fourth signal which is representative of a binary representation of the total number of data channels which are available to provide data to be displayed on said cathode ray tube screen;

a digital-to-analog converter means to therein convert said fourth signal from digital form to analog form, said first signal being provided as the output from said digital-to-analog converter means.

23. Apparatus in accordance with claim 22 additionally comprising:

means for establishing a fifth signal representative of the number of a particular one of said plurality of data channels, the data from which is to be highlighted on said cathode ray tube screen;

means for establishing a sixth signal representative of the number of a particular one of said plurality of data channels, the data from which is being currently transferred to said cathode ray tube screen;

means for comparing said fifth signal and said sixth signal and for establishing a seventh signal which assumes a first logic state only when said fifth signal is equal to said sixth signal; and means for supplying said seventh signal to said cathode ray tube screen to thereby highlight the data, from the particular data channel represented by said fifth signal, when said seventh signal is in said first logic state.

* * * * *